United States Patent [19]

Vangbo et al.

[11] Patent Number: 5,423,934

[45] Date of Patent: Jun. 13, 1995

[54] METHOD FOR PRODUCING A LAMINATE

[75] Inventors: Hakan Vangbo, Järfälla; Roger Svensson, Bålsta, both of Sweden

[73] Assignee: AB Carl Munters, Sollentuna, Sweden

[21] Appl. No.: 167,901

[22] PCT Filed: Jun. 18, 1992

[86] PCT No.: PCT/SE92/00446

§ 371 Date: Dec. 17, 1993

§ 102(e) Date: Dec. 17, 1993

[87] PCT Pub. No.: WO93/00220

PCT Pub. Date: Jan. 7, 1993

[30] Foreign Application Priority Data

Jun. 20, 1991 [SE] Sweden ................ 9101938

[51] Int. Cl.6 .................................... B31F 1/22
[52] U.S. Cl. ...................... 156/208; 156/205; 156/210; 106/600; 427/344; 427/397.7; 427/397.8

[58] Field of Search ............... 156/205, 208, 210; 210/493.4, 497.1; 106/600, 38.3; 427/344, 397.8, 439, 397.7; 165/8, 89; 502/407, 410, 415, 425

[56] References Cited

U.S. PATENT DOCUMENTS

| | | | |
|---|---|---|---|
| 3,112,184 | 11/1963 | Hollenbach | 210/493.4 X |
| 3,307,617 | 1/1963 | Munters . | |
| 3,419,937 | 8/1965 | Bally . | |
| 3,826,703 | 7/1974 | Russell | 427/439 X |
| 4,911,775 | 3/1990 | Kuma et al. | 156/208 X |

Primary Examiner—Michele K. Yoder
Attorney, Agent, or Firm—Dowell & Dowell

[57] ABSTRACT

A method for producing a laminate structure from smooth and corrugated webs which may be used to form a corrugated or cellular contactor for the exchange of heat, moisture, and the like. The paper webs are saturated with a concentrated waterglass solution and partially dried. A first web is then corrugated after which the first and second webs are pressed together to form a laminate structure which is subsequently dried.

5 Claims, 1 Drawing Sheet

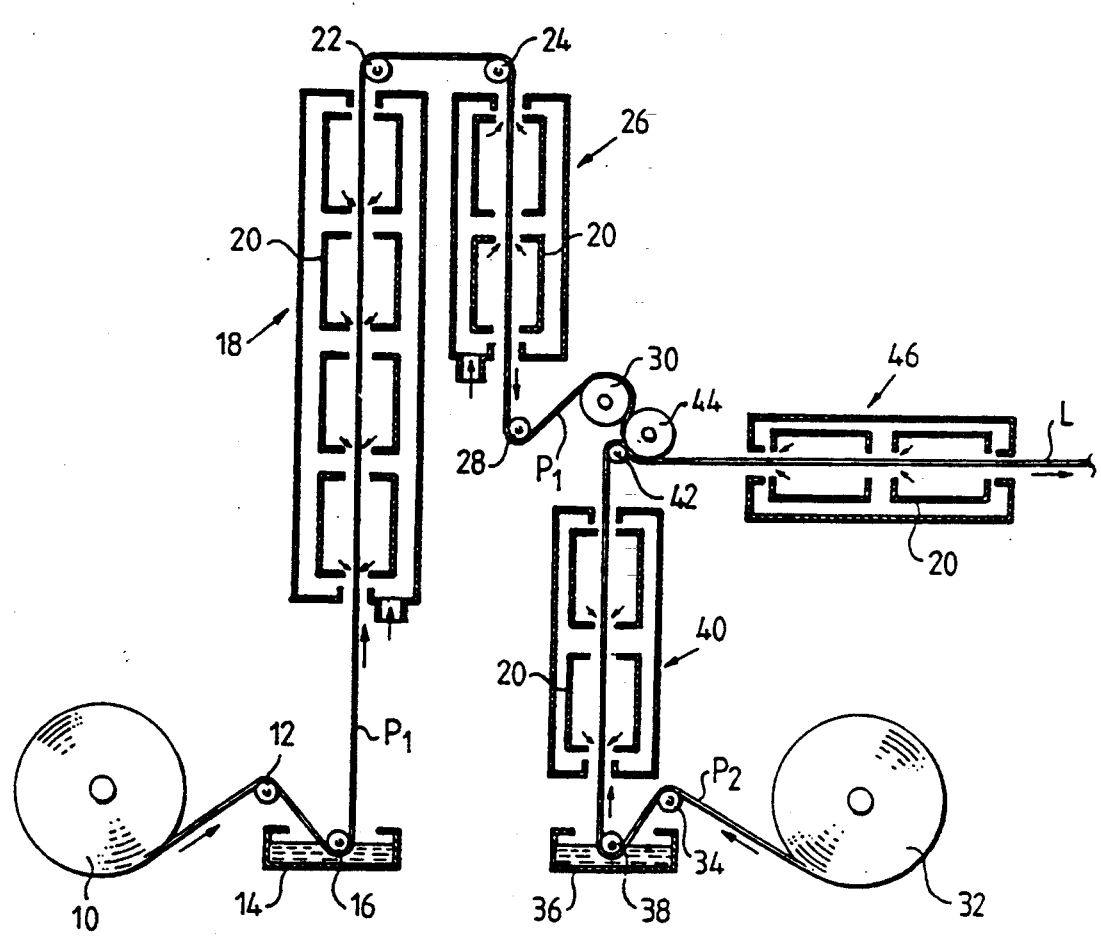

METHOD FOR PRODUCING A LAMINATE

BACKGROUND OF THE INVENTION

1. Field of the Invention

The present invention relates to a method of manufacturing a laminated structure comprised of alternate smooth and corrugated board which forms a corrugated laminate for the subsequent manufacture of contact bodies, hereinafter referred to as contactors, for use in the manufacture of heat-exchangers and moisture-exchangers and corresponding devices.

2. History of the Related Art

Contactors, such as those which are intended for the exchange of moisture or heat, or both, are typically comprised of thin layers of formable material, such as paper webs of glass fibers, cellulose or the like, which can be formed into a laminate structure, by combining smooth and corrugated paper-web board or sheets and mutually bonding the sheets so as to form a structure that exhibits a plurality of open, passageways or cells.

In known methods for producing such contactors, for instance in the form of a rotor, the corrugated and smooth paper webs are normally joined together with the aid of an organic adhesive, which is also applied to the laminate when coiling the laminate to form a rotor-shaped contactor, or when binding smooth laminate sheets to a cube-shaped contactor. The contactor is then impregnated with a waterglass solution, so as to form a gel which is then subsequently treated converted into to a solid substance on the contactor, thereby imparting moisture-transferring and heat-transferring properties to the contactor. The contactor is normally impregnated with waterglass, by immersing the cube-shaped or rotor-like contactor in a waterglass solution. This method is encumbered with several drawbacks, however. For instance, it is desirable to impregnate the contactor with the greatest possible amount of waterglass, in order to impart good moisture-transference and heat-transference properties to the contactor. However, as a result of the large quantities of waterglass absorbed by the submerged contactor, the contactor shrinks in size by 15 to 20%. It is necessary to take this shrinkage into account when manufacturing the contactor blank or preform. Another draw-back with this known method is that it is often necessary to burn-off the organic adhesive, in order to provide a contactor which will not burn readily. However, those laminate surfaces which were earlier covered by the adhesive will not have been impregnated with waterglass during the impregnation process and will therefore be devoid of waterglass when the adhesive is burned-off. Another drawback of the known method, in which the finished contactor is submersed in a waterglass solution, is that the narrow contactor passageways easily become blocked, meaning that the waterglass solution used must be relatively thin-bodied. Still another drawback is that the waterglass solution is relatively unevenly distributed throughout the contactor.

U.S. Pat. No. 3,419,937 teaches a method of manufacturing filters by impregnating a cellulose paper with a slurry that contains petalite and a small amount of talc mixed in an epoxy solution. The paper is brought to a desired form and then heat-treated. This method, which relates to the manufacture of porous filter material, cannot be applied in the manufacture of a heat exchange contactor of the kind to which the present invention relates, since the introduction of those substances included in the slurry used with the known method would impair the properties of the contactor.

SUMMARY OF THE INVENTION

The main object of the present invention is to provide a method and an arrangement which will eliminate the draw-backs of the known manufacturing processes.

Another object is to provide a method and an arrangement for manufacturing contactors which the extent to which the material shrinks or contracts during the gelling process is reduced.

A further object of the invention is to provide a method and an arrangement for manufacturing contactors in which the impregnating substances, such as waterglass, are distributed evenly throughout the contactor, in a controlled manner, during the manufacturing process. These and other objects of the invention are achieved with an inventive method and an inventive arrangement having the characteristic features set forth in the following method and apparatus claims.

BRIEF DESCRIPTION OF THE DRAWINGS

The invention will now be described in more detail with reference to an exemplifying embodiment thereof illustrated in the accompanying drawing, the single FIGURE illustrates schematically a plant for producing a laminate structure comprised of alternating smooth and corrugated sheets and capable of being used in the manufacture of contactor bodies.

DESCRIPTION OF THE PREFERRED EMBODIMENT

The illustrated plant includes a roll 10 consisting of a paper-web of formable, or shapeable material, such as fiber glass, cellulose or like material. The web is taken from the roll 10 in the direction of the arrow shown, and is passed over a guide roller 12 and down into a vessel 14 which contains concentrated waterglass solution. The web $P_1$ is guided down beneath the surface of the water-glass solution in the vessel 14 with the aid of a guide roller 16, which is immersed in the solution. As the web $P_1$ passes through the vessel 14, the web becomes saturated with concentrated waterglass solution. As will be understood, the waterglass solution, which may consist of a sodium-silicate solution which is later converted to silicate gel for impregnating the paper, may be brushed or otherwise applied to the paper web in quantities such as to saturate the web. After having been saturated with the concentrated waterglass solution, the paper web $P_1$ is moved upwards, as seen in the drawing, to a drying station 18, which includes a plurality of drying sections 20. In the illustrated case, the four drying sections may either operate with hot-air units or infrared units. The paper web $P_1$ is then advanced, via guide rollers 22 and 24, to a further drying station 26 which includes drying sections 20 of the aforedescribed kind and in which the paper web $P_1$ is further dried. When the web leaves the drying station 26, the waterglass will have a dry solids content of about 45-65%, preferably 45-55%. The paper web $P_1$ is then passed, via a guide roller 28, to a corrugating roller 30 on which the web $P_1$ is corrugated so as to form a large number of shallow corrugations in the paper web.

In order to obtain the aforedescribed laminate having alternate smooth and corrugated layers, a second paper web $P_2$ is taken from a paper roll 32 and passed, via a guide roller 34, into a vessel 36 which contains concentrated waterglass solution and into which the paper web $P_2$ is immersed, via a roller 38. The paper web $P_2$ is therewith saturated with concentrated waterglass solution and is passed from the vessel 36 to a drying station 40 which includes a plurality of drying sections 20 of the same kind as those earlier described with reference to drying of the paper web $P_1$. The paper web $P_2$ is dried in the drying station 40, preferably from the side of the web which will later face away from the paper web $P_1$ when the two webs $P_1$, $P_2$ are brought together to form a laminate. Although the drying process affects the whole of the paper web, the side which faces towards the web $P_1$ in the laminating process will have a higher moisture content than the outwardly facing side of the web. After leaving the drying station 40, the paper web $P_2$ is combined with the corrugated paper web $P_1$, via a guide roller 42, and the combined paper webs forming the laminate L are pressed together between the guide roller 42 and the roller 44, thereby bonding the webs together with the waterglass functioning as a bonding agent. After bonding together the two paper webs, the resultant laminate L is passed through a further drying station 46, which includes a plurality of drying sections 20 of the aforedescribed kind. The laminate is dried in the drying station 46 to a dry solids content of about 60–95% with respect to waterglass.

As will be understood from the aforegoing, the paper in the laminate L is impregnated initially with large quantities of waterglass sufficient to impart the desired properties to the contactor subsequently manufactured from the laminate. Because the paper web $P_1$, which is subsequently corrugated, is saturated with waterglass and then dried to a dry solids content of about 45–65%, preferably 45–55%, and is thus in a wet, plastic state, it is possible to use smaller corrugation heights and therewith obtain a uniform, homogenous corrugated surface structure without risk of blocking the subsequent passageways. Since waterglass is the only adhesive used to bond the layers together, there is no need to burn-off the rotor and the laminate will thereby be impregnated over the whole of its surface, including the bonding locations. When practicing the inventive method, the silica gel formed in the aforesaid after-treatment is less fluffy and thus produces less dust when the contactor is used.

As will be understood, the invention is not limited to the illustrated and described method and arrangement, and that modifications and variations can be made within the scope of the following claims.

We claim:
1. A method for producing a laminate structure including a flat sheet and a corrugated sheet in the manufacture of heat and moisture exchange contactors wherein the sheets are formed of formable paper web material, the method comprising the steps of:
  A. Saturating a first and a second paper web with a concentrated waterglass solution;
  B. Drying the first of the paper webs to a dry solids content of approximately 45–65% with respect to waterglass and partially drying the second paper web so that one side of the second paper web has a higher moisture content than the opposite side thereof;
  C. Corrugating the first paper web;
  D. Pressing the corrugated first paper web and the partially dried second paper web together to form the laminate structure; and
  E. Heating the laminate structure to a dry solids content of approximately 60–95% with respect to waterglass.

2. The method of claim 1 in which said second paper web is partially dried by directing a heating source toward the opposite side thereof.

3. The method of claims 1 or 2 in which said first and second paper webs are saturated by immersing said first and second webs in said concentrated waterglass solution.

4. The method of claim 3 in which said first paper web is dried to a solids content of between 45–55% with respect to waterglass.

5. The method of claim 1 in which said first paper web is dried to a solids content of between 45–55% with respect to waterglass.

* * * * *